United States Patent [19]

Takayama et al.

[11] Patent Number: 5,077,571
[45] Date of Patent: Dec. 31, 1991

[54] ELECTRIC FOCUSING APPARATUS

[75] Inventors: Toru Takayama, Yokohama; Yoshiharu Shiokama, Kawasaki, both of Japan

[73] Assignee: Nikon Corporation, Tokyo, Japan

[21] Appl. No.: 544,235

[22] Filed: Jun. 26, 1990

[30] Foreign Application Priority Data

Jun. 28, 1989 [JP] Japan .................................. 1-163802

[51] Int. Cl.$^5$ ............................................. G03B 13/36
[52] U.S. Cl. ..................................................... 354/400
[58] Field of Search ......................................... 354/400

[56] References Cited

U.S. PATENT DOCUMENTS

| 4,477,167 | 10/1984 | Ishikawa et al. | 354/400 |
| 4,537,487 | 8/1985 | Taniguchi et al. | 354/400 |
| 4,745,425 | 5/1988 | Kusaka | 354/400 |
| 5,008,605 | 4/1991 | Ohara et al. | 354/400 |

Primary Examiner—Russell E. Adams
Attorney, Agent, or Firm—Shapiro and Shapiro

[57] ABSTRACT

An electric focusing apparatus comprises a focusing optical system, a focus adjusting motor, transmitting means for transmitting the drive force of the focus adjusting motor to the focusing optical system, drive amount detecting means for detecting the drive amount of the focus adjusting motor, movement limit detecting means for detecting a first drive stopping position in which the focusing optical system is driven in one direction by the focus adjusting motor and is stopped by one movement limit and a second drive stopping position in which the focusing optical system is driven in the other direction by the focus adjusting motor and is stopped by the other movement limit, planned drive amount memory means for memorizing a planned drive amount preset by one movement limit and the other movement limit of the focusing optical system, and backlash amount calculatng means for calculating the backlash amount of the transmitting means on the basis of the drive amount detected by the drive amount detecting means during the time from after the movement limit detecting means detects the first drive stopping position until it detects the second drive stopping position, and the planned drive amount memorized by the planned drive amount memory means.

5 Claims, 7 Drawing Sheets

ELECTRIC FOCUSING APPARATUS

BACKGROUND OF THE INVENTION

1. Field of the Invention

This invention relates to an electric focusing apparatus for detecting the defocus amount of an object image formed by a photo-taking lens, calculating on the basis of the result of the detection the drive amount of a drive motor for driving the focusing optical system of the photo-taking lens (an optical system moved for focus adjustment), and controlling the drive motor on the basis of the result of the calculation to thereby effect the focus adjustment of the photo-taking lens or effect power focusing.

2. Related Background Art

An electric focusing apparatus provided in a photographing apparatus has an AF sensor for detecting a defocus amount or the like (or measuring a distance), a CPU for calculating and processing the detected information, a motor driven by the control of the CPU, a detecting device for detecting the drive amount of the motor and feeding back it to the CPU, body side and lens side gear trains for decelerating the driving of the motor, and a connecting member between these body side and lens side gear trains.

In such an electric focusing apparatus, there is always backlash in the gear train for decelerating the driving of the motor. Further, between the body side connecting member and the lens side connecting member, there is so-called backlash resulting from loosening or play. As a result, when the motor is driven in one direction and thereafter in the opposite direction, a state in which the motor is driven but the focusing lens is not moved exists in conformity with the above-mentioned backlash (including the so-called backlash). Therefore, the focusing lens is moved by only an amount smaller by the backlash than the amount of movement necessary for focusing (which amount will hereinafter be referred to as the backlash amount). For the lens to be focused, the in-focus state must further be detected and the motor must be driven and thus, a long time is correspondingly required for the focusing operation. An apparatus for solving this problem is proposed in U.S. Pat. No. 4,537,487, and this apparatus is such that the data of the backlash amount of the aforementioned gear trains or the like is prepared in advance and correction is exerted on the drive amount of the motor during the focusing operation.

In the apparatus of the above-mentioned U.S. patent, however, the amount of backlash caused by the gear trains and the connecting members is the design value. That is, in an actual product, the backlash amount deviates from the design value due to the irregularity of manufacture, the change in parts with time, etc. and therefore, the apparatus proposed in the above-mentioned U.S. Patent cannot solve the problem completely.

SUMMARY OF THE INVENTION

The present invention has as its object the provision of an electric focusing apparatus for measuring a backlash amount existing in an actual camera body and lens and making more complete correction of the backlash amount possible.

The electric focusing apparatus of the present invention is provided with (a) drive amount detecting means for detecting the actual drive amount of a focus adjusting motor for driving a focusing optical system, (b) movement limit detecting means for detecting a first drive stopping position in which said focus adjusting motor is driven in one direction and is stopped by one movement limit provided in said focusing optical system and a second drive stopping position in which said focus adjusting motor is driven in the other direction and is stopped by the other movement limit in said focusing optical system, and (c) backlash detecting means for detecting the actual backlash amount on the basis of the drive amount detected by said drive amount detecting means during the time from after said movement limit detecting means detects said first drive stopping position until said movement limit detecting means detects said second drive stopping position and a planned drive amount inherent to the focusing optical system.

Here, the planned drive amount is the amount of movement of the focusing optical system from the first drive stopping position to the second drive stopping position.

In the present invention, the planned drive amount (the design value) corresponding to the amount of movement of the focusing optical system from one movement limit (for example, the ∞ side limit), i.e., the first drive stopping position, to the other movement limit (for example, the close distance side limit), i.e., the second drive stopping position, is memorized in advance in a lens CPU, the drive amount of the motor corresponding to said planned drive amount is compared with the drive amount of the motor detected with the focusing optical system actually driven from one movement limit to the other movement limit, the memorized backlash amount is corrected, and the focusing operation is performed on the basis of the corrected backlash amount.

BRIEF DESCRIPTION OF THE DRAWINGS

DESCRIPTION OF THE PREFERRED EMBODIMENTS (1) Brief Description of the Construction, etc. of an AF camera Having an Electric Focusing Apparatus FIG. 1 shows the construction of an AF camera incorporating therein an electric focusing apparatus which is an embodiment of the present invention.

Figure 1:
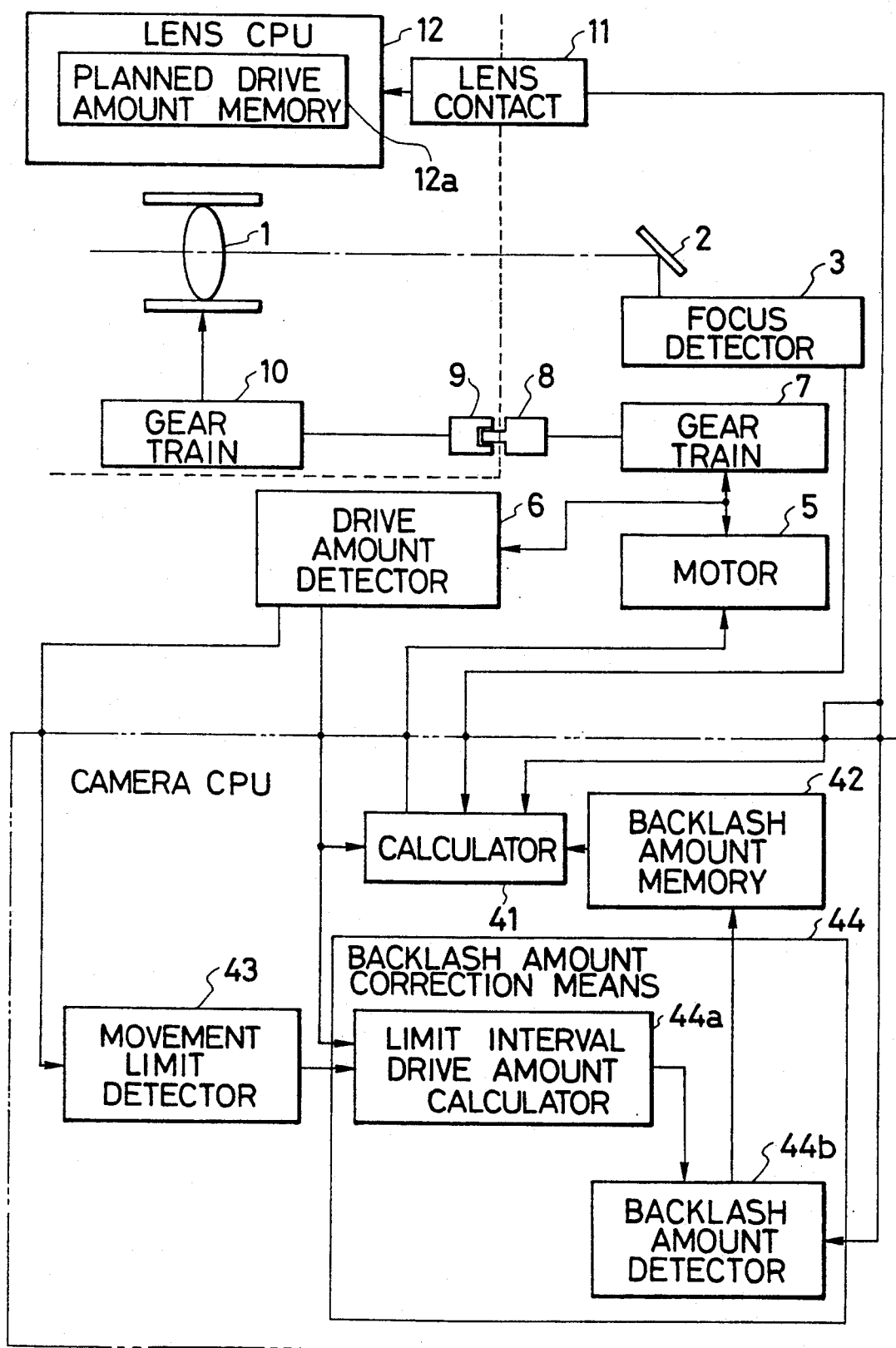
FIG. 1 is a conceptual diagram showing an embodiment of the present invention.

A light beam passed through a photo-taking lens 1 (which is a concept including a focusing optical system although shown as a single lens for convenience' sake, and which in the present embodiment, is an interchangeable lens removably mountable on a camera body) is reflected by a mirror 2 and directed to the AF sensor 3 of focus detecting means. The AF sensor 3 converts the intensity of the light beam into an electrical signal and transmit the signal to the calculating means 41 of a camera CPU 4. The calculating means 41 digitally processes said signal and detects the defocus amount. Further, the calculating means 41 of the camera CPU 4 calculates the drive amount of the photo-taking lens, i.e., the focusing optical system by information for AF control sent thereto from a lens CPU 12 through a lens contact 11 and said defocus amount, and starts the driving of a focus adjusting motor 5.

The rotation of the focus adjusting motor 5 is decelerated by a gear train 7 on the camera side, is transmitted to the lens side by AF couplings 8 and 9, is further decelerated by a gear train 10 on the lens side and is transmitted to the focusing optical system, i.e., the focusing lens. The gear trains 7, 10 and the couplings 8, 9 together constitute transmitting means. On the other hand, the rotation of the motor 5 is detected as a pulse number by drive amount detecting means 6 and is fed back to the calculating means 41 and movement limit detecting means 43. Thus, by moving the focusing optical system to a predetermined in-focus position while monitoring the drive amount of the motor 5, the focusing operation can be accomplished.

The movement limit detecting means 43 of the camera CPU 4 is designed to detect the stoppage of the drive when the pulse detected by the drive amount detecting means 6 is generated no longer. The outputs from the drive amount detecting means 6, the movement limit detecting means 43 and the lens CPU 12 are input to the backlash amount correction means 44 of the camera CPU 4. The outputs of the drive amount detecting means 6 and the movement limit detecting means 43 are input to limit interval drive amount calculating means 44a. The actual limit interval motor drive amount detected thereby is compared, in backlash amount detecting means 44b, with a planned motor drive amount obtained by processing a planned drive amount sent thereto from planned drive amount memory means 12a in the lens CPU 12. The difference between this actual limit interval motor drive amount and the planned motor drive amount is a backlash amount. This backlash amount is memorized by backlash amount memory means 42 in the camera CPU 4. The calculating means 41 already described drives the motor 5 while exerting correction on the basis of this backlash amount, thereby effecting the focusing operation.

Figure 2:
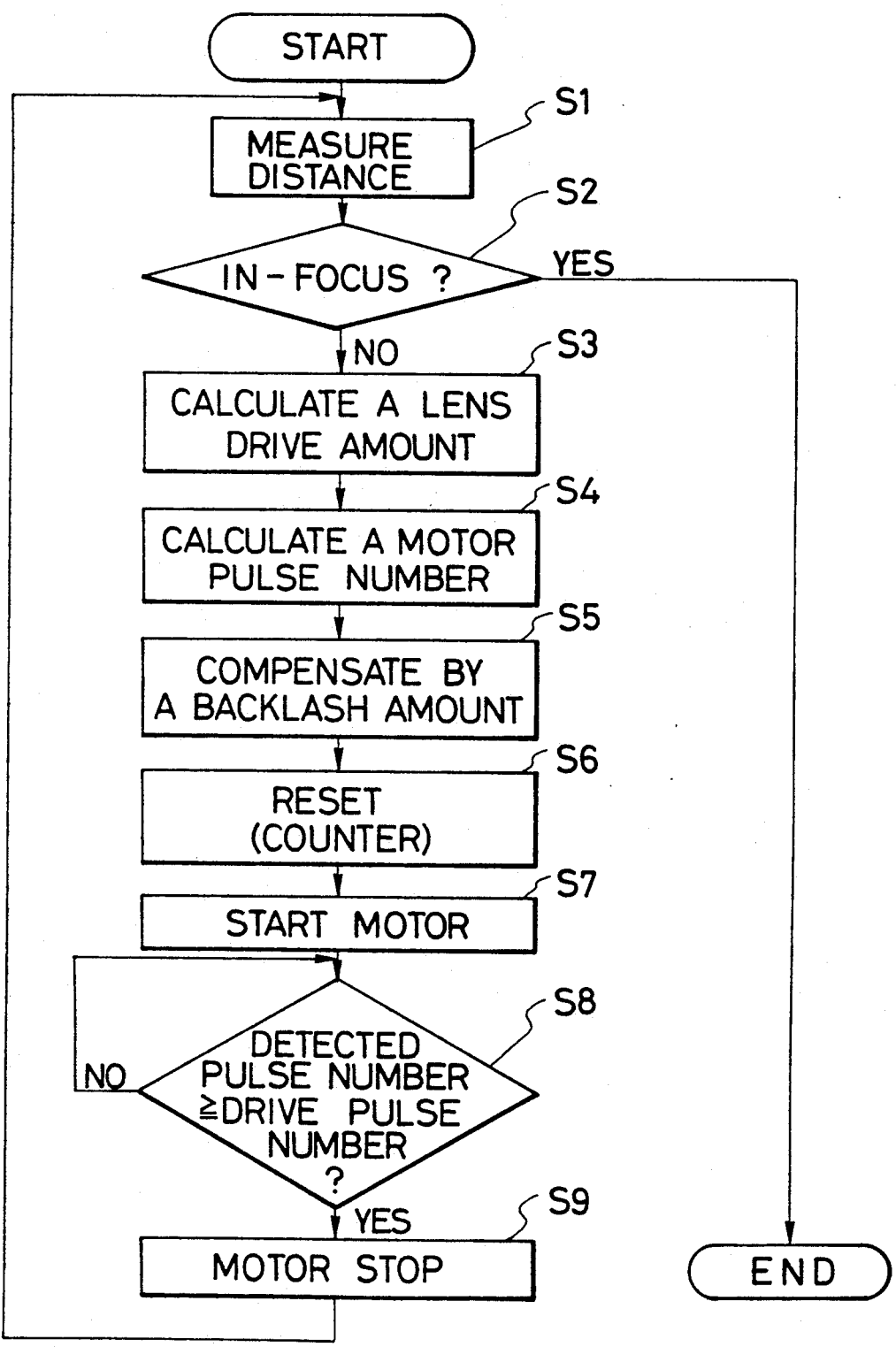
FIG. 2 is a flow chart of the focusing operation.

The basic focusing operation of this AF camera will hereinafter be described briefly. FIG. 2 is a flow chart showing the focusing operation of this AF camera.

The program is first started by the half-depression of a release button. At a step S1, detection of the defocus amount is effected. In this case, the distance to an object to be photographed may be measured and the amount and direction of out-of-focus may be detected. At a step S2, whether the lens is in focus is judged. If the lens is in focus, the focusing operation is directly terminated. If it is judged that the lens is not in focus, the amount by which the focusing lens should be driven is calculated from said defocus amount (or the amount and direction of out-of-focus) (a step S3). Subsequently, a drive pulse number for driving the motor is calculated from the drive amount of the focusing lens (a step S4). At a step S5, the above-mentioned calculated drive pulse number is corrected on the basis of the backlash amount memorized by the memory means 42 (the details of the detection and correction of this backlash amount will be described later). At a step S6, a counter (in the calculating means 41) for counting the pulse number detected by the motor drive amount detecting means 6 is set. Then, the driving of the motor corresponding to the pulse number after corrected is started (a step S7). The detected pulse number corresponding to the actual drive amount of the motor 5 is counted by a counter. If at a step S8, it is judged that the detected pulse number has reached the corrected drive pulse number, the motor 5 is stopped (a step S9). Thereafter, return is made to the step S1, where the defocus amount is again calculated, and if the lens is in focus, the program ends, and if the lens is not in focus, the above-described series of steps S3-S9 are repeated.

(2) Brief Description of the Concept of the Operation of Detecting the Backlash Amount FIGS. 3A-3F illustrate the concept of the backlash amount detecting operation.

Figure 3A:
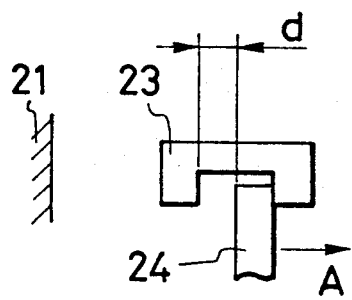
FIGS. 3A–3F are schematic views illustrating the operation of detecting and correcting the backlash amount.

First, in FIG. 3A, a driving member 24 corresponds to the motor 5 in FIG. 1, and a driven member 23 is driven through the gear trains 7, 10, AF couplings 8, 9, etc. of FIG. 1. The movement limits 21 and 22 of the driven member 23 should be considered to be the ∞ side limit or the close distance side limit of the focusing optical system 1. A backlash amount d occurs between the driving member 24 and the driven member 23. During the backlash amount detecting operation, the driving member 24 once moves in the direction of arrow A and at the same time, the driven member 23 is also moved in the direction of arrow A.

Figure 3D:
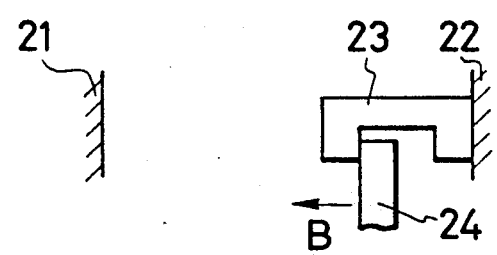
Figure 3B:
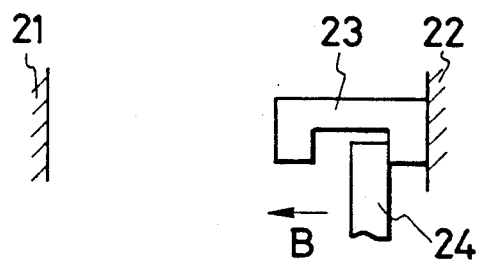

Next, in FIG. 3B, the driven member 23 strikes against the limit 22 and is stopped thereby, and the driving member 24 is also stopped. Simultaneously therewith, the counter for the detected pulse number corresponding to the drive amount of the driving member 24 is reset and the movement of the driving member 24 in the direction of arrow B is started.

Figure 3E:
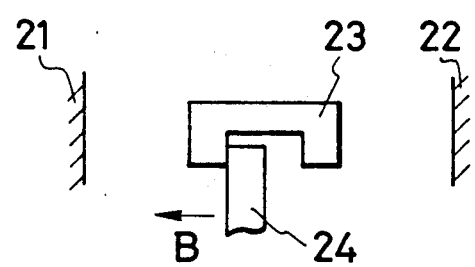
Figure 3C:
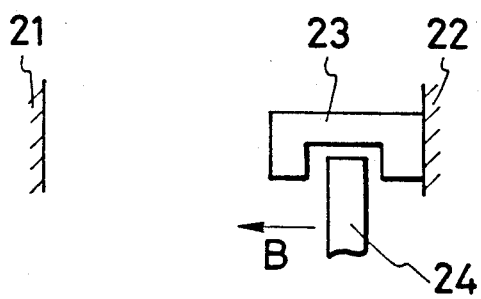

Referring to FIG. 3C, the driving member 24 is moving in the direction of arrow B, while the driven member 23 remains stopped due to the backlash amount d.

Next, in FIG. 3D, the driving member 24 has moved by the backlash amount d in the direction of arrow B and therefore, the driven member 23 also starts to move in the direction of arrow B.

In FIG. 3E, both of the driving member 24 and the driven member 23 are moving in the direction of arrow B.

Figure 3F:
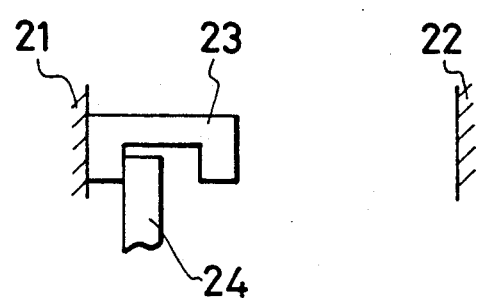

Finally, in FIG. 3F, the driven member 23 strikes against the limit 21 and is stopped thereby. At the same time, the driving member 24 is also stopped, and the pulse count by the counter is terminated.

As described above, the driving member 24 moves more by the backlash amount d than the driven member during the time when the driven member 23 is moved from the limit 22 to the limit 21. Accordingly, if the planned drive amount (for example, the design value or the measured value during the manufacture) necessary to move the driven member 23 from the limit 22 to the limit 21 is memorized in advance, the backlash amount d can be detected by detecting the difference between the actual drive amount of the driving member 24 and said planned drive amount. Thus, if the drive amount of the driving member during the focusing operation is corrected on the basis of this backlash amount, a quicker focusing operation will become possible.

(3) Operation of Detecting and Correcting the Backlash Amount

Figure 4:
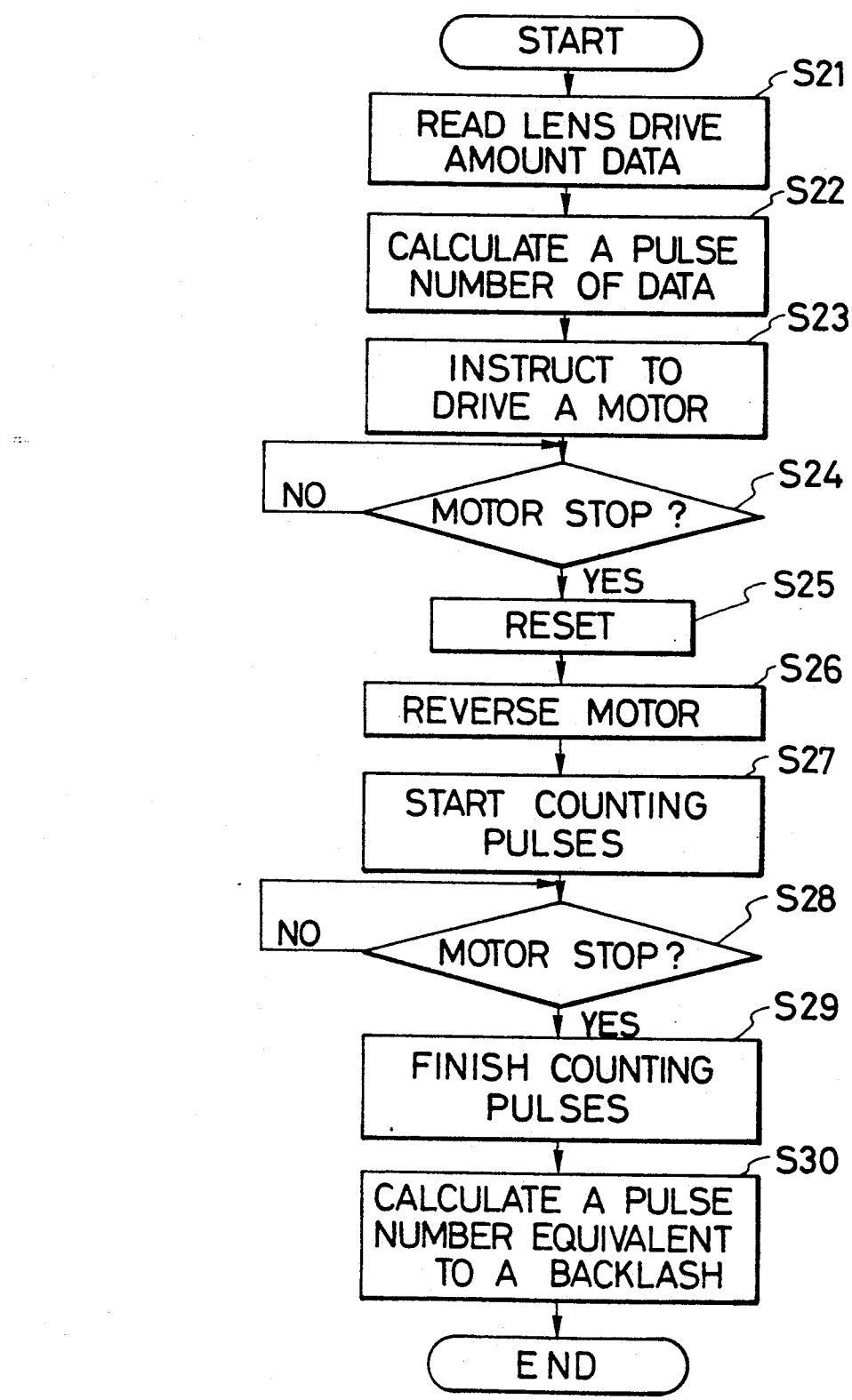
FIG. 4 is a flow chart of the operation of detecting and correcting the backlash amount.

FIG. 4 is a flow chart of the backlash amount detecting operation of the CPU 4. This backlash amount detecting operation is started, for example, by closing the main switch of the camera body, or by half-depressing the release button immediately after the mounting of an interchangeable lens.

At a step S21, the backlash amount correction means 44 of the camera CPU 4 effects communication with the lens CPU 12 (see FIG. 7, and which will be described later) provided in the photo-taking lens, and reads he lens drive amount data memorized in the planned drive amount memory means 12a. This lens drive amount data is data representative of the preset planned drive amount (the design value) from one movement limit to the other movement limit of the focusing optical system in the photo-taking lens 1, and may be the actual drive amount or other converted numerical value or signal.

At a step S22, the backlash amount correction means calculates a pulse number corresponding to the planned drive amount of the focusing optical system 1, i.e., the lens drive amount data. When there is no backlash, the focusing optical system 1 is moved from one movement limit to the other movement limit by the driving of the motor 5 corresponding to said calculated pulse number.

At a step S23, the backlash amount correction means outputs a command for driving the motor toward the close distance side limit of the focusing optical system 1, through the calculating means 41.

In response to the motor driving command, the motor 5 starts to be driven, and when the focusing optical system 1 driven by the motor 5 is moved until it strikes against the movement limit, and is stopped thereby, the motor 5 is also stopped at the same time. The stoppage of the motor 5 is detected by the movement limit detecting means 43 (a step S24). Thereafter, the resetting of the counter of the limit interval drive amount calculating means 44a is effected (a step S25). The motor 5 is reversed after it is stopped at the same time. The stoppage of the motor 5 is detected by the movement limit detecting means 43 (a step S24). Thereafter, the resetting of the counter of the limit interval drive amount calculating means 44a is effected (a step S25) The motor 5 is reversed after it is stopped (a step S26). The limit interval drive amount calculating means 44a starts counting the pulse output from the motor drive amount detecting means 6 (a step S27). In a while after the motor 5 is reversed, the focusing optical system 1 is also reversed and is moved until it strikes against the movement limit on the opposite side to said limit (i.e., the ∞ side limit), whereafter it is stopped. The motor 5 is also stopped. This stoppage of the motor 5 is detected from the output of the motor drive amount detecting means 6 as at the step S24 (a step S28). Upon detection of the stoppage of the motor, the pulse counting is terminated (a step S29). Since the difference between the detected pulse number thus counted and said calculated pulse number corresponding to the planned drive amount is equivalent to a backlash amount, the pulse number equivalent to the backlash corresponding to said difference is calculated by the backlash detecting means 44b, and the memory means 42 memorizes as data this pulse number equivalent to the backlash (a step S30). Each time this operation is repeated (that is, when the lens is interchanged and/or the main switch of the camera side is changed over from its OFF state to its ON state or when the driving from one limit to the other limit is effected during lens servo), the data of the backlash amount is renewed and rewritten, and the operation of detecting and correcting the backlash amount is performed.

Figure 5:
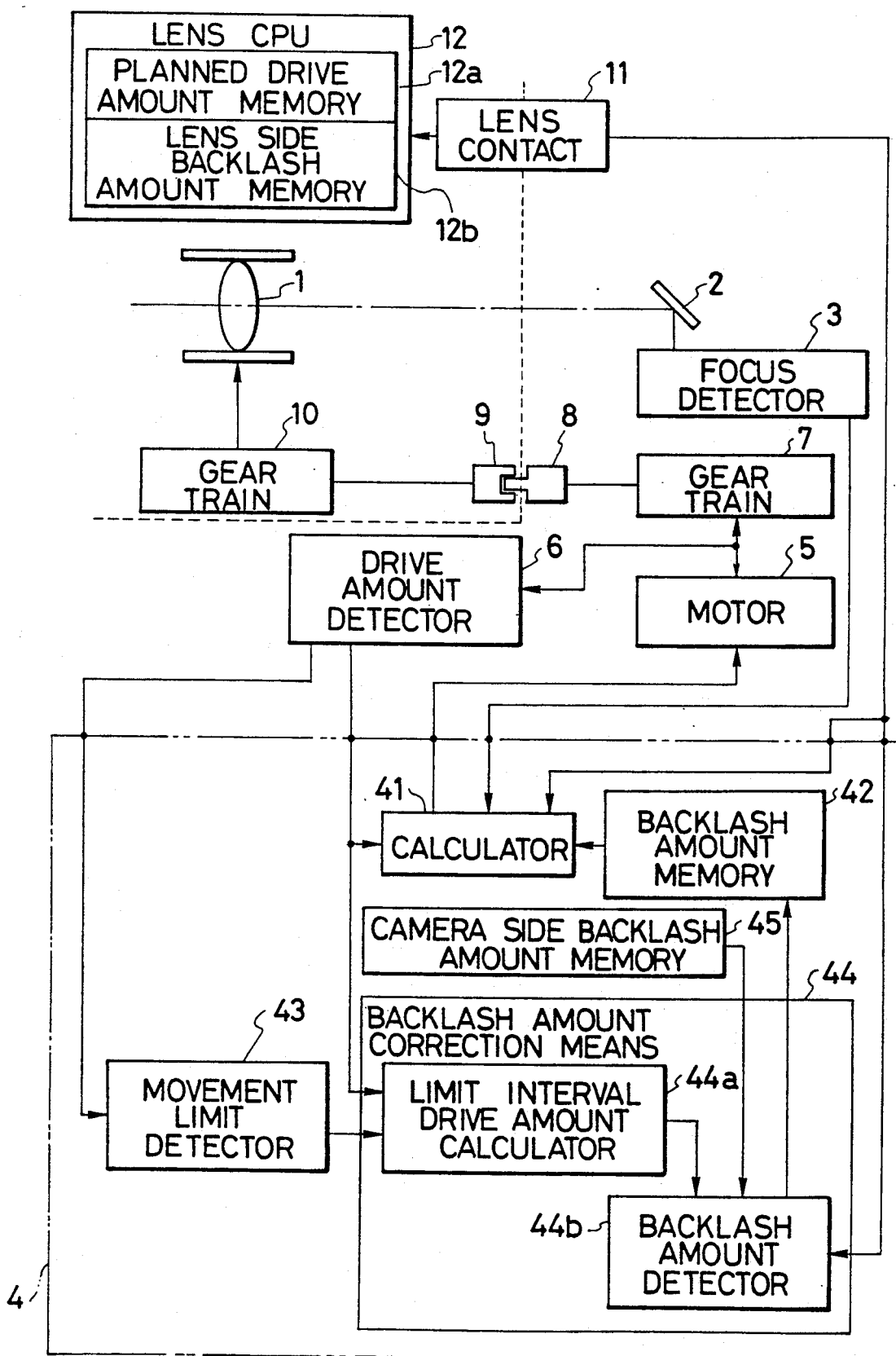
FIG. 5 is a conceptual diagram showing another embodiment of the present invention.

In the FIG. 1 embodiment described above, it is necessary without fail to effect the backlash detecting operation, i.e., the operation of forcibly driving the lens from one limit to the other limit, when the lens is interchanged or when the camera side main switch is changed over from its OFF state to its ON state. In contrast, an embodiment in which any special operation for backlash detection as previously described is not performed will now be described with reference to FIG. 5. In FIG. 5, portions common to those in FIG. 1 are given indentical reference numerals.

In the embodiment of FIG. 5, the design value of the backlash amount estimated for the lens side gear train 10 is memorized in the lens side backlash amount memory means 12b in the lens side CPU 12, and the design value of the backlash amount estimated for the camera side gear train 7 is memorized in the camera side backlash amount memory means 45 in the camera side CPU 4.

When the main switch of the camera body is changed over from its OFF state to its ON state or when the release button is half-depressed immediately after an interchange lens is mounted, the backlash amount detecting means 44b receives backlash amount information from the lens side backlash amount memory means 12b and the camera side backlash amount memory means 45 and combines the information to thereby calculate the design backlash amount of the entire driving system, and transmits it to the backlash amount memory means 42. The calculating means 41, in its initial state, effects the correction of the drive control of the motor on the basis of the design backlash amount calculated in this manner. When thereafter, during lens servo, the driving from one limit to the other limit is effected, the backlash amount is calculated in accordance with the flow of FIG. 4 each time and the backlash data memorized in the backlash amount memory means 42 is renewed. If this is done, it is possible to decrease the frequency of the unnecessary forced servo of the lens and effect backlash amount correction more approximate to the actual value in a state in which the backlash amount could be renewed.

Figure 6A:
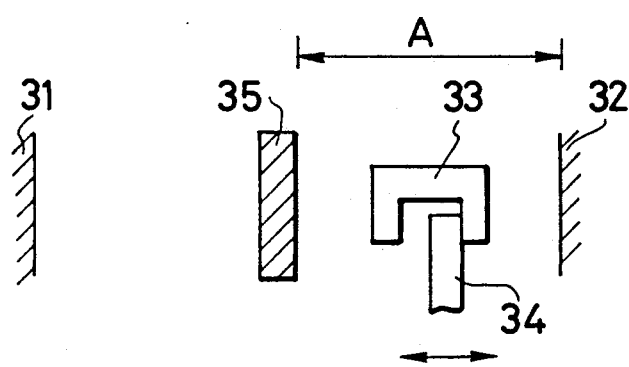
FIGS. 6A–6C are construction views showing a case where there is a middle limit in a photo-taking lens.
Figure 6B:
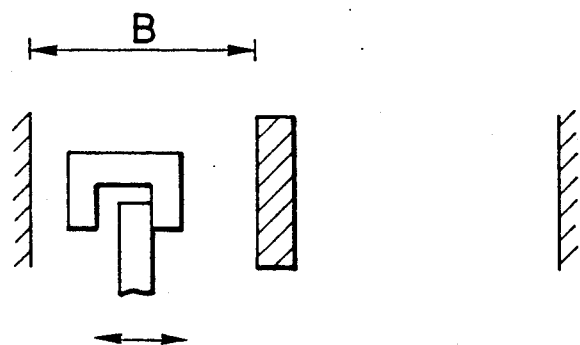
Figure 6C:
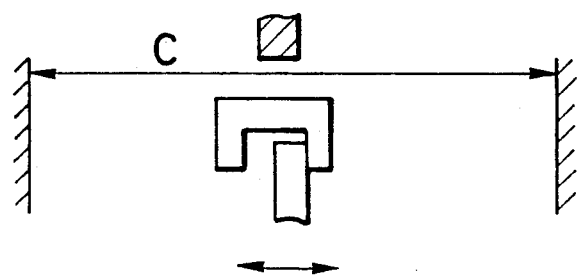

FIGS. 6A-6C are schematic views showing a case where the movement limits of the driven member of the focusing optical system or the like are provided only on the ∞ side and the close distance side but also therebetween. Between the ∞ side limit 31 and the close distance side limit 32, there is disposed a middle drive limit member 35 which is another movement limit. A driving member 34 and a driven member 33 are disposed among these movement limits 31, 32 and 35. In this apparatus, it is to be understood that the range of movement of the driven member 33 can be set to three states as shown in FIGS. 6A, 6B and 6C.

In FIG. 6A, the middle limit 35 is used to operate the driven member 33 on the close distance side limit side and therefore the range of movement of the driven member 33 is a range of movement A. In FIG. 6B, the middle limit 35 is also used and the range of movement of the driven member 33 on the ∞ side limit side is a range of movement B. In FIG. 6C, the middle limit 35 is not used and therefore the range of movement of the driven member 33 is a range of movement C. If provision is made of means for distinguishing between these ranges of movement A, B and C, it will become possible to detect and correct the backlash amount from the planned drive amount corresponding to each range of movement in the same manner as in the flow chart of FIG. 4.

Figure 7:
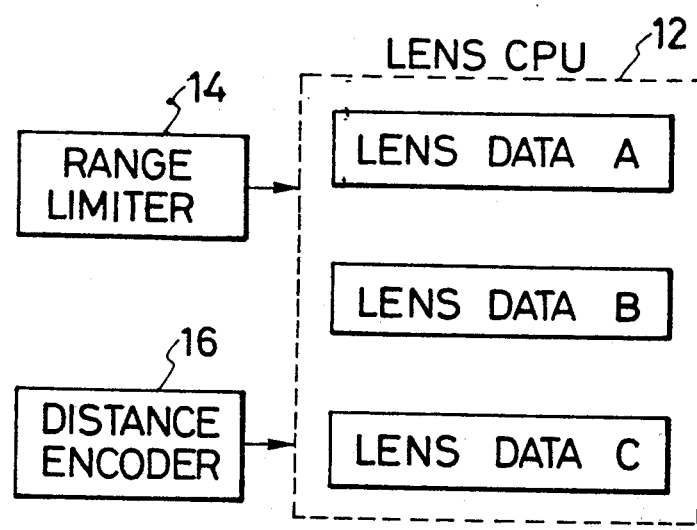
FIG. 7 is a block diagram of a device for judging the range of movement on the photo-taking lens side.

FIG. 7 shows the construction of the CPU 12, etc. of a photo-taking lens whose range of movement can be selected. Whether the middle limit 35 should be used is judged by the output from a range limiter 14. On the other hand, in which of the left and right ranges of movement the driven member 33 is is detected by a distance encoder 16.

Figure 8:
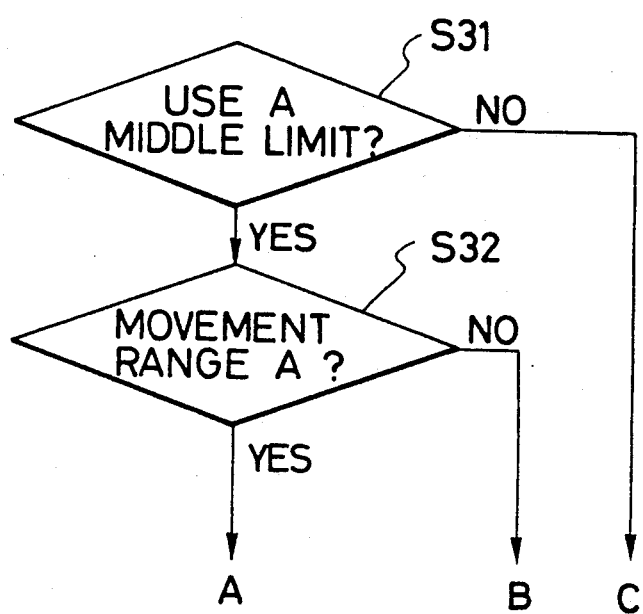
FIG. 8 illustrates the judgment of the range of movement in FIGS. 6A–6C.

FIG. 8 is a flow chart showing a part of the operation of detecting the range of movement by the CPU 12. At a step S31, whether the middle limit is used is detected, and if the middle limit is not used, the range of movement is judged to be the range of movement C. At a step S32, in which of the left and right ranges of movement the driven member 33 is is detected and which of the close distance side range of movement A and the ∞ side range of movement B the range of movement is is judged.

If planned drive amount data corresponding to the thus judged ranges of movement A, B and C are memorized in advance in the lens CPU 12 and are suitably output from the photo-taking lens side to the camera body side, the backlash amount can be detected and corrected as in the case where the middle limit is absent.

While the present embodiment has been described as having the focus detecting means (including the CPU 4) and the motor driving means on the body side, of course, the present invention is also effective for an apparatus having the motor driving means in the photo-taking lens. Further, the focus detecting means may be had in the photo-taking lens, or the motor driving means and the focus detecting means may both be provided in the photo-taking lens.

Also, the present embodiment has been described as an interchangeable lens type system in which the lens is removably mountable on the camera body, but of course, the present invention is also effective for a fixed type lens system in which the lens and the camera body are integral with each other.

Although the above embodiments have been described with respect to an automatic focusing apparatus, what has been described above also holds true of another embodiment, for example, power focusing in which the focusing lens 1 is driven by the motor 5 in conformity with the amount of manual operation of a focusing ring. That is, during power focusing as well, the drive force of the motor 5 is transmitted to the focusing lens 1 through the transmitting means (the gear trains 7, 10 and the couplings 8, 9) and therefore, it is necessary to correct the drive amount of the motor 5 based on the amount of manual operation by the backlash amount, with the backlash amount of the transmitting means taken into account as in the above-described embodiments.

According to the present invention, the electric focusing apparatus is not operated on the basis of a backlash amount found in advance, but correction is exerted by a backlash amount designed by detecting and correcting the backlash amount with respect to the actual body and lens and therefore, any variation in the backlash amount caused by irregularity in manufacture and a change with time can also be coped with.

That is, the backlash amount can be corrected correspondingly to changes such as the backlash of the reduction gear trains and the play of the couplings and therefore, a quick and highly accurate focusing operation can be accomplished.

Further, the backlash amount and play amount for each combination of a lens and a body are actually calculated and therefore, the apparatus is free from the influence of the irregularity of the product and the change with time.

We claim:

1. An electric focusing apparatus comprising:
a focusing optical system;
a focus adjusting motor;
transmitting means for transmitting the drive force of said focus adjusting motor to said focusing optical system;
drive amount detecting means for detecting the drive amount of said focus adjusting motor;
movement limit detecting means for detecting a first drive stopping position in which said focusing optical system is driven in one direction by said focus adjusting motor and is stopped by one movement limit, and a second drive stopping position in which said focusing optical system is driven in the other direction by said focus adjusting motor and is stopped by the other movement limit;
planned drive amount memory means for memorizing a planned drive amount preset by one movement limit and the other movement limit of said focusing optical system; and
backlash amount calculating means for calculating the backlash amount of said transmitting means on the basis of the drive amount detected by said drive amount detecting means during the time from after said movement limit detecting means detects said first drive stopping position until it detects said second drive stopping position, and the planned drive amount memorized by said planned drive amount memory means.

2. A camera body comprising:
a focus adjusting motor;
transmitting means for transmitting the drive force of said focus adjusting motor to the focusing optical system of a photo-taking lens;
drive amount detecting means for detecting the drive amount of said focus adjusting motor;
movement limit detecting means for detecting a first drive stopping position in which the focusing optical system of said photo-taking lens is driven in one direction by said focus adjusting motor and is stopped by one movement limit, and a second drive stopping position in which the focusing optical system of said photo-taking lens is driven in the other direction by said focus adjusting motor and is stopped by the other movement limit; and
backlash amount calculating means for memorizing a planned drive amount preset by one movement limit and the other movement limit of the focusing optical system of said photo-taking lens, and calculating the backlash amount of said transmitting means on the basis of the drive amount detected by said drive amount detecting means during the time from after said movement limit detecting means detects said first drive stopping position until it detects said second drive stopping position, and said memorized planned drive amount.

3. An electric focusing apparatus comprising:
a focusing optical system;
a focus adjusting motor;
transmitting means for transmitting the drive force of said focus adjusting motor to said focusing optical system;

drive amount detecting means for detecting the actual drive amount of said focus adjusting motor;

focus detecting means for detecting the defocus amount of an object image formed by said focusing optical system;

calculation means for calculating on the basis of said defocus amount the planned drive amount of said focus adjusting motor necessary to move said focusing optical system to the in-focus position;

memory means for memorizing the backlash amount in said transmitting means;

correcting means for correcting on the basis of said backlash amount the planned drive amount calculated by said calculation means;

movement limit detecting means for detecting a first drive stopping position in which said focusing optical system is driven in one direction by said focus adjusting motor and is stopped by one movement limit, and a second drive stopping position in which said focusing optical system is driven in the other direction by said focus adjusting motor and is stopped by the other movement limit; and correction means for calculating the actual backlash amount of said transmitting means and correcting the backlash amount memorized by said memory means, on the basis of the drive amount detected by said drive amount detecting means during the time from after said movement limit detecting means detects said first drive stopping position until it detects said second drive stopping position, and the planned drive amount memorized by said planned drive amount memory means.

4. An electric focusing apparatus according to claim 3, wherein said memory means includes lens barrel side memory means provided in a lens barrel and memorizing a backlash amount inherent to said lens barrel, and camera side memory means provided in a camera body and memorizing a backlash amount inherent to said camera body.

5. An electric focusing apparatus according to claim 3, wherein said correcting means operates in response to the mounting of an interchangeable lens barrel onto a camera body or in response to the closing of a power source switch.

* * * * *